METHOD FOR FABRICATING AN ELECTRICAL MEMORY MODULE

Filed Feb. 5, 1963 4 Sheets-Sheet 1

INVENTORS.
JOSEPH H. ENGELMAN
WILLIAM A. WITSELL
BY
Carl Fissell Jr.
AGENT

METHOD FOR FABRICATING AN ELECTRICAL MEMORY MODULE

Filed Feb. 5, 1963 4 Sheets-Sheet 2

INVENTORS.
JOSEPH H. ENGELMAN
BY WILLIAM A. WITSELL
Carl Fissell Jr.
AGENT

METHOD FOR FABRICATING AN ELECTRICAL MEMORY MODULE

Filed Feb. 5, 1963 4 Sheets-Sheet 3

INVENTORS.
JOSEPH H. ENGELMAN
WILLIAM A. WITSELL
BY
Carl Fussell Jr.
AGENT

Oct. 17, 1967 J. H. ENGELMAN ET AL 3,347,703

METHOD FOR FABRICATING AN ELECTRICAL MEMORY MODULE

Filed Feb. 5, 1963 4 Sheets-Sheet 4

INVENTORS.
JOSEPH H. ENGELMAN
BY WILLIAM A. WITSELL
Carl Fissell Jr.
AGENT 3,347,703
METHOD FOR FABRICATING AN ELECTRICAL MEMORY MODULE Joseph H. Engelman, Paoli, and William A. Witsell, West Chester, Pa., assignors to Burroughs Corporation, Detroit, Mich., a corporation of Michigan Filed Feb. 5, 1963, Ser. No. 256,377
8 Claims. (Cl. 117—212)

This invention relates to magnetic memory information storage and transfer apparatus, and more particularly, to such apparatus wherein one or more thin films are arranged on an electrically insulating substrate in a manner such that the magnetizable material is positioned extremely close and in planar relation to the electrical circuitry used therewithin affording excellent magnetic operational characteristics.

With still more particularity, the invention has to do with magnetic memory information storage and transfer apparatus wherein electrically insulating high heat resistant material having conductive circuitry secured thereto or embedded therein is provided with a fire polished electrically insulating, smooth, flat, glass-like surface layer over which magnetic material is disposed and over which electrical insulation is applied for reception of additional conductive circuitry thereon in a manner electrically insulating the magnetic material from the conductive circuitry while electrically interconnecting such circuitry so as to form e.g., a substantially flat coil or helix encircling the magnetic material effectively providing a magnetic parametron memory plane, shift register or electrical solenoid.

In computer apparatus generally, it is necessary and desirable to store information and retrieve the same at a relatively rapid rate. Of the many methods which have been proposed to accomplish this end, one which appears to have a high degree of merit and efficiency is the magnetic memory plane.

Where size and packing density are problems, the magnetic thin film memory device offers the smallest, most efficient and consistently reliable miniaturized type of storage and information transfer apparatus. Such devices usually employ an electrically insulating substrate on which one or more electrical conductors are disposed in operative relation to a magnetizable film evaporatively deposited or otherwise disposed thereon. In order to make such devices practical and useful, and of sufficient speed to be operably efficient, it is necessary that the input-output-control conductors lie substantially flush with the magnetizable material and that the insulating film separating the electrical conductors from the magnetizable material be of a non-porous character since any openings or holes will short the magnetizable material through to the conductors and destroy the effects sought to be accomplished. Thus it is a requirement for the efficient operation of such magnetic devices that the surface on which the magnetizable material is to be deposited be equivalent to a fire polished surface.

It is an object therefore, of the present invention to provide a new and novel magnetic thin film memory storage and information transfer apparatus which solves the foregoing problems.

A further object of the invention is to provide a thin film storage device wherein the storage element and the input-output circuitry therefore are evaporatively deposited on a dielectric substrate and insulating separated by a fire polished surface layer.

A still further object of the invention is to provide as a new article of manufacture a miniaturized thin film storage and transfer apparatus wherein electrical control and signal conductors encircle an overlay of magnetizable material.

Another object of the invention is to provide a method of fabricating a magnetic thin film memory storage and transfer device wherein magnetizable material is evaporatively deposited as a thin film overlay adjacent and parallel to conductors recessed within grooves formed in a dielectric substrate and from which the overlay is electrically insulated by a fire polished insulating surface layer.

In accordance with the foregoing objects and first briefly described, the present invention in one of its broadest aspects relates to a method of fabricating magnetic storage and transfer apparatus wherein conductive material is applied to a dielectric high heat resistant substrate in a prearranged pattern forming electric conductors thereon over which an insulating high heat resistant coating is applied and heated to a substantially high temperature to fire polish the coating into a substantially flat glass-smooth planar surface relative to the conductors. A thin magnetizable film of material is then applied to the fire polished surface after which an electrically insulating layer is overlayed thereon. Finally, conductive material is disposed on the last named layer in a pattern to form electrical conductors interconnecting with the first mentioned conductors effectively encirculating the magnetizable material.

Another aspect of the invention has to do with a magnetic memory storage and transfer module as a new article of manufacture in which a substrate of electrically insulating high heat resistant material upon which conductive material is secured in a desired pattern forming electrical conductors thereon, is provided with a fire polished heat resistant layer over which a layer of magnetic material is deposited and upon which electrical conductors are insulatingly disposed for interconnection to the first mentioned conductors.

Still another aspect of the invention has to do with a magnetic memory plane or memory module wherein an electrically insulating substrate carrying a plurality of magnetizable bits of material is provided with information, drive and sense conductors arranged in a manner permitting the module to be demountably, pluggably employed with conventional printed wiring connectors for efficient construction, operation, maintainence, repair and replacement.

These and other objects and advantages of the invention will become more clearly defined by reference to the following description and accompanying claims wherein the nature of the invention and the method of carrying the same into practice may be clearly understood. One embodiment of the invention will now be described with reference by way of example to the accompanying drawings in which:

With reference to the various figures of the drawings which will be discussed in the order of their occurrence, it is seen first in FIG. 1 that a substrate 10 of electrically insulating material such as glass, ceramic or other high heat resistant substance is cut to suitable shape and thickness, such for example, as a one by one inch square. A readily available material for this purpose is the conventional glass microscope slide which may be cut to suitable dimensions. Obviously, the shape and thickness of the substrate is strictly a matter of design choice and has no appreciable effect upon the electrical characteristics of the resulting device.

Figures 1, 2, 3, 4, 5, 6, 7:
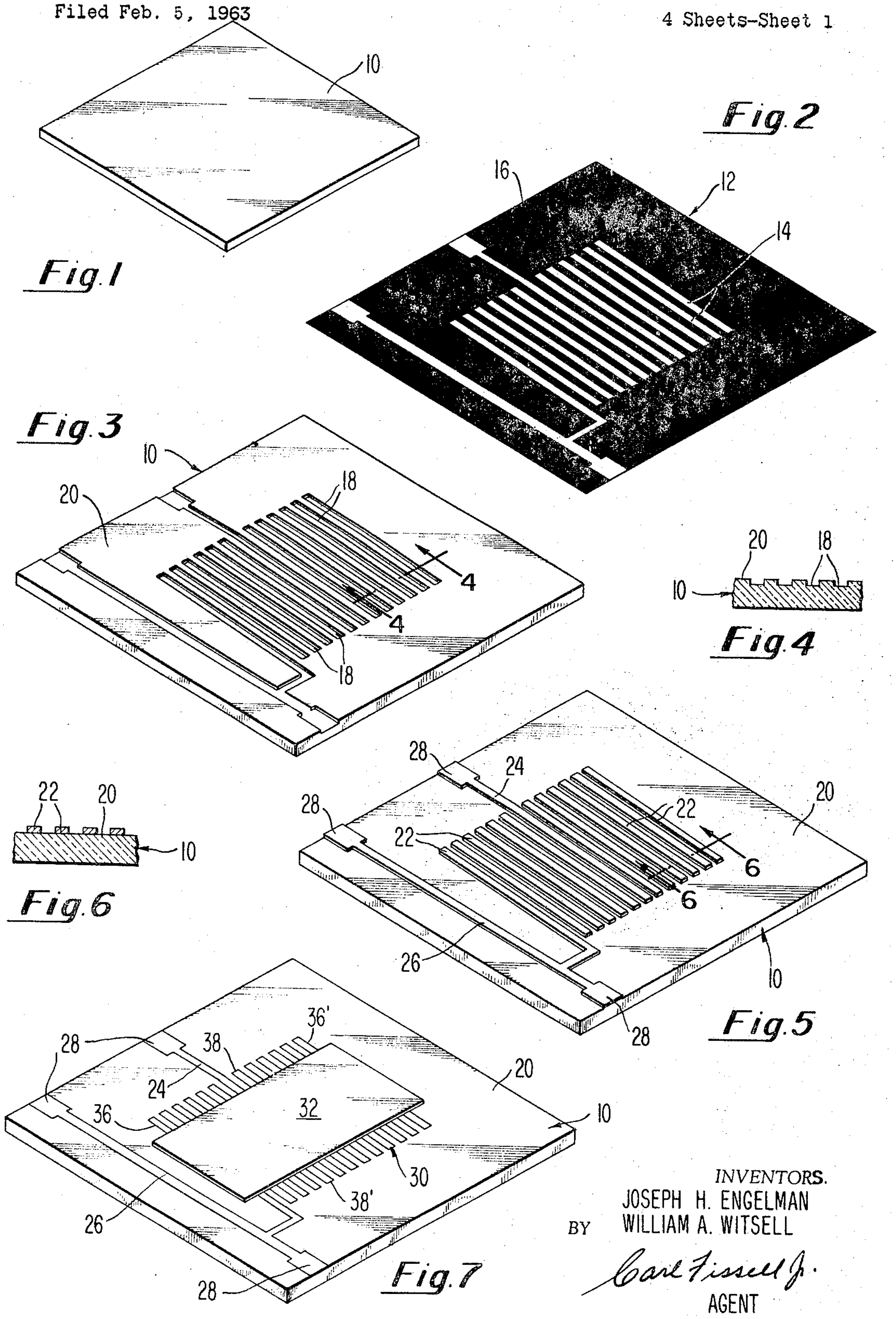
FIG. 1 is an isometric view of a high temperature electrically insulating substrate for use with the present invention.
FIG. 2 is an isometric view of a pattern-mask for use with the apparatus.
FIG. 3 is an isometric view of a substrate similar to that of FIG. 1 wherein the elements which form the lower set of electrical conductors are disposed in grooves in the substrate in accordance with the pattern of FIG. 2.
FIG. 4 is a partial sectional view along the line 4—4 of FIG. 3.
FIG. 5 is an isometric view of a substrate similar to that of FIG. 1 wherein the lower set of electrical conductors are overlayed as raised lands upon the surface of the substrate.
FIG. 6 is a partial sectional view along the line 6—6 of FIG. 5.
FIG. 7 is an isometric view of the device of FIG. 3 with the electrically insulating overlay applied thereto.

A suitable pattern or mask 12, FIG. 2, is provided and may not be a photographic negative, as illustrated, having parallel spaced apart translucent areas 14 and peripheral opaque areas 16.

The mask 12 may be employed to form a template for use in an ultrasonic cutting or drilling machine (not shown) in which case a finned or ribbed (positive) pattern member is provided for attachment to the ultrasonic transducer head so that the pattern of the mask 12 is transferred, i.e., cut as grooves 18, FIG. 3, into the surface 20 of the member 10 resulting in the configuration shown in cross section in FIG. 4.

If the lower set of conductors of the devices are to be applied to the surface 10 as by conventional screening techniques, the screen acts as the mask and conductive material is forced through the open areas of the screen in the desired prearranged pattern, onto the substrate thereby forming raised electrical conductors 22 disposed in parallel spaced apart arrangement as in FIG. 6 and including a center tap conductor 24 and a longer separate input-output-conductor 26. Individual terminal contacts or pads 28 for electrical interconnection into other associated electrical circuitry are provided. These terminals also permit the present apparatus, in its completed form, to be pluggably employed with conventional printed wiring plug-in connectors.

Alternatively, lower electrical conductors 30, FIG. 7, can be formed in the grooves 18 as by spraying metallic conductive material, e.g., silver nitrate, over the entire surface 20 of the member 10 and thereafter electroplating a copper coating onto the silver. Sandpaper or diamond grit may then be used to abraid the slightly raised surface so as to reduce the layers of metal down to the substrate base leaving only the grooves 18 filled with conductive silver plated over with copper.

In another procedure, silver paste may be brushed over the entire surface of member 10 and then wiped off with a doctor blade after which the member 10 is fired at a temperature of 650° C. This process is repeated until the grooves 18 are filled flush with the surface 20 of the member 10.

An electrically insulating coating 32, FIG. 7, of high temperature, heat resistant material, e.g., #890 liquid glass, a potting glaze manufactured by Thomas C. Thompson Co., Highland Park, Ill., is next screened onto the surface of the conductors 22 or 30 through a mask similar to the mask 34, FIG. 8. The glass coating 32 which is seen to overlap and extend slightly beyond opposite ends 36–36′ of the group of conductors and slightly inwardly away from the ends 38–38′ thereof is then fired at 500–700° C. to glaze the coating and bond the same to the conductors and to the surface of the substrate 10. This operation produces a uniform fire polished, glass-like, smooth, substantially flat port or hole free surface permitting the material laid down in the next step, as hereinafter described, to be flat and flush thereagainst.

The substrate is next placed in an evaporation chamber (not shown) but which may be similar to apparatus described and claimed in copending U.S. patent application, Serial No. 238,165, filed November 16, 1962, for "Electronic Circuit Fabrication Apparatus," in the names of John G. Simmons, Douglas E. Moister, Jr. and David A. Starr, Jr., and assigned to the same assignee as the present invention. A mask, similar to mask 34, is employed with the vacuum apparatus whereby a thin film 40, FIG. 9, of magnetizable material, e.g., iron, nickel-iron and various magnetic alloys, a few thousand angstroms thick, is deposited over the glass coating 32 in a rectangular configuration extending across the pattern of conductors again leaving the ends 38–38′ of the conductors 30 exposed for purposes to be explained hereinafter.

Thereafter an organic insulating material is screened or sprayed onto the substrate through a suitable pattern mask similar to that of FIG. 7, so as to cover the magnetic thin film 40 and glass coating 32 with a thin, smooth, glassy layer 42 after which the assembly is fired at 135° C. Conversely, silicon dioxide can be evaporatively deposited onto the magnetic film 40 immediately after the film is evaporatively deposited onto the substrate 10.

Figures 8, 9, 10, 11:
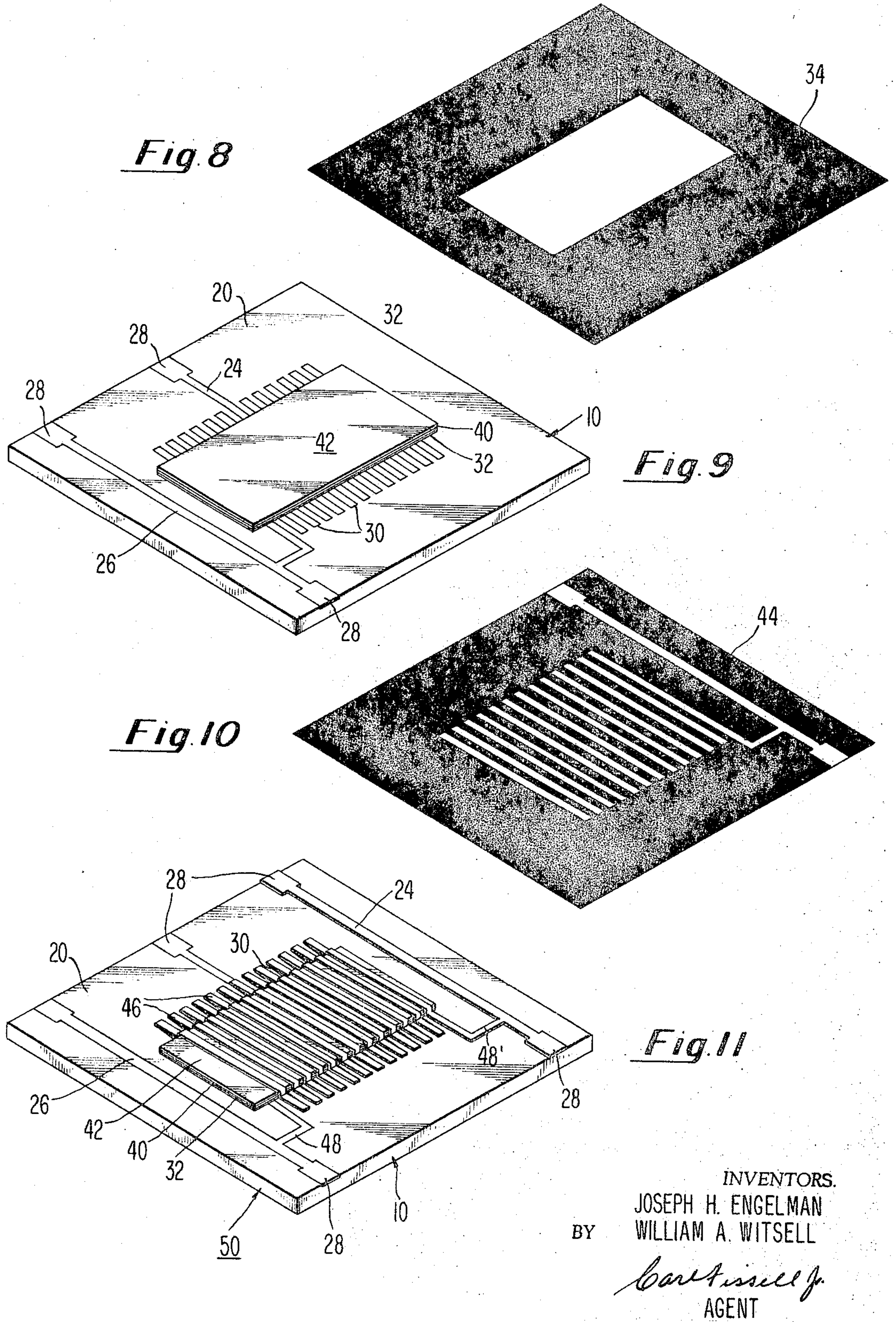
FIG. 8 is an isometric view of a pattern-mask for applying the insulating coating to the conductor elements of the apparatus of FIGS. 3 and 5.
FIG. 9 is a view similar to FIG. 7 illustrating the magnetizable thin film layer and the insulating overlay thereon.
FIG. 10 is an isometric view of a pattern-mask for producing the upper set of conductors for the present invention.
FIG. 11 is a view illustrating one embodiment of a completed device according to the teaching of the invention.

Finally, utilizing a mask 44, FIG. 10, an "air drying" or low temperature silver material is screened onto the glass layer coating 42 in order to form an upper set of electrical conductors 46 similar to conductors 22 and 30 and simultaneously to interconnect conductors 46 to conductors 22 or 30 as well as with conductors 24 and 26 and pads 28.

Alternatively, the entire substrate 10 can be sprayed with metallic silver. Then, utilizing a photoresist process, the unwanted silver can be etched away, leaving only the conductors and pads as seen in FIG. 11. Using the opposite end conductors 48 and 48′ of the thus formed coil as electrical contacts, the silver conductors are then plated with copper in a chemical bath which does not attack or react with the magnetic material 40. The resulting structure 50 is substantially similar to that shown in FIGS. 11 and 12.

As an alternative to the first step hereinabove set forth the first conductor pattern can be screened onto the substrate 10 or the substrate can be sprayed with metallic silver. A photoresist material, e.g., Kodak Photo Resist (KPR) manufactured by Eastman-Kodak, Rochester, New York, may then be painted or sprayed over the silver coating. The photoresist coating is then exposed to actinic light through a mask similar to mask 12.

Next, suitable development in conventional developer exposes the copper. A layer of gold is then plated upon the copper. The unwanted photoresist is removed with suitable solvents. Finally, an etchant bath, e.g., ferric chloride is used to reduce the unwanted copper, leaving exposed the gold layer.

Figure 12:
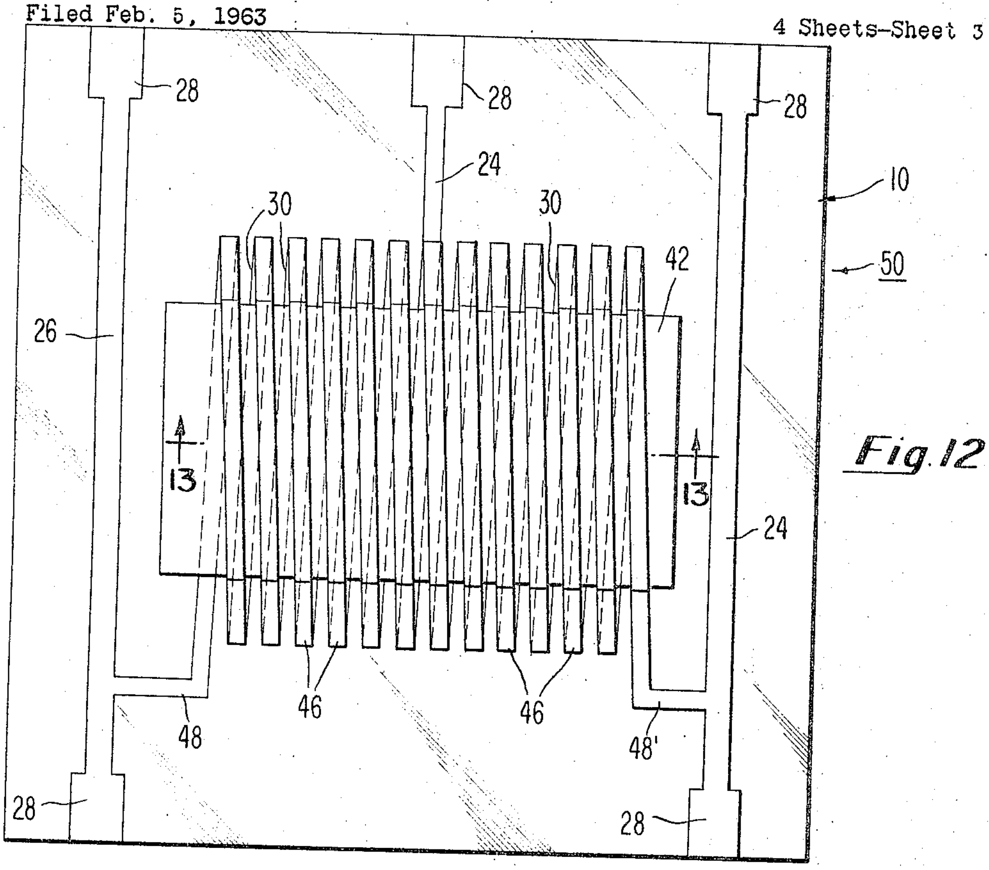
FIG. 12 is a greatly enlarged plan view of a completed memory storage and transfer device.
Figure 13:
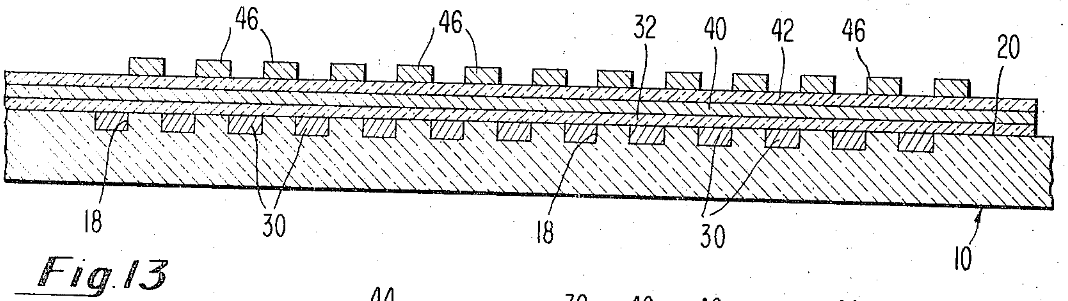
FIG. 13 is a greatly enlarged idealized sectional view along the line 13—13 of FIG. 12.
Figure 14:
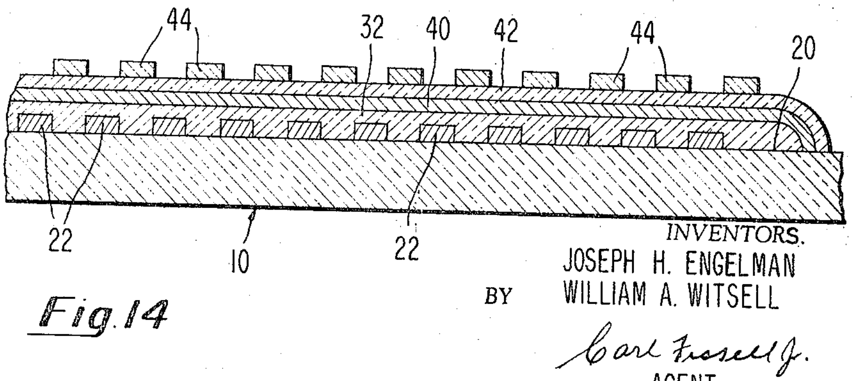
FIG. 14 is an idealized sectional view similar to FIG. 13 but illustrating the embodiment of the invention wherein the conductors are formed as raised lands on the surface of the substrate.

FIG. 12 is a greatly enlarged plan view of a thin film parametron logic device fabricated in accordance with the teachings of the present invention and illustrates the manner in which the upper and lower sets of parallel conductors are slightly offset relative to one another in order to achieve a planar helical type coil surrounding a thin film of metal bonded onto an electrically insulating fire polished surface disposed upon a substrate such as glass or ceramic.

In the foregoing manner and method a 20 turn, 10 mil wide planar electrically conductive solenoid coil has been successfully produced upon a substantially flat dielectric substrate. Such apparatus has a wide variety of uses such as parametrons and shift registers in computer circuits or as thin film memory components.

The technique hereinabove set forth can also be utilized, as will be apparent from a study of FIGS. 15–18 to produce miniaturized magnetic memory planes or information storage and transfer modules. Following the steps set forth above a glass substrate 52 may be provided with a plurality of grooves as in FIG. 3, into which conductive material is deposited or the conductive material may be screened onto the surface 54 of the substrate 52 in the manner illustrated in FIG. 5. In either case, the first set of conductors provided as a result of this operation are or may be characterized as drive windings in the parlance of the art.

A plurality of such drive conductors 56 are formed on the substrate 52 and arranged in parallel spaced apart relation. The specific number of such conductors being a matter of design choice predicated, among other considerations, upon the total number of bits of information it is desired to be able to activate, store and interrogate. Over these conductors 56 is disposed an insulating layer 58 of glass or other similar heat resistant dielectric material formed in any suitable manner as earlier described.

Arranged in parallel spaced apart relation in groups of three and disposed at right angles to the conductors 56 are a plurality of conductors 60, 62 and 64. Conductors 60 and 64 being the information windings whereas conductors 62 serve as the sense windings.

A layer 66 of electrically insulating high heat resistant material such as glass is applied as an overlay upon the conductors 60, 62 and 64, in the manner earlier referred to herein and thereafter heated to a sufficiently high temperature to produce a fire polished, smooth, flat, porefree surface 68. Magnetizable material is then disposed upon the surface 68 in a pattern of rows and columns of bits 70, e.g., 3 x 5 mm. forming a matrix as is conventional practice. Electrical insulation 72 is next applied over the magnetizable bits 70. Rows of parallel spaced apart conductors 74, 76 and 78, arranged in groups of three in the manner of conductors 60, 62 and 64 are disposed over the insulating layer 72 parallel with conductors 60, 62 and 64 and centrally aligned relative to the magnetizable bits 70 as seen most clearly in FIG. 16. Electrically insulating material 80 is next applied over the conductors 74, 76 and 78 as heretofore explained after which a plurality of rows of spaced apart conductors 82 are arranged thereover parallel relative to the first set of conductors 56 and form the upper or second set of drive windings.

Figure 15:
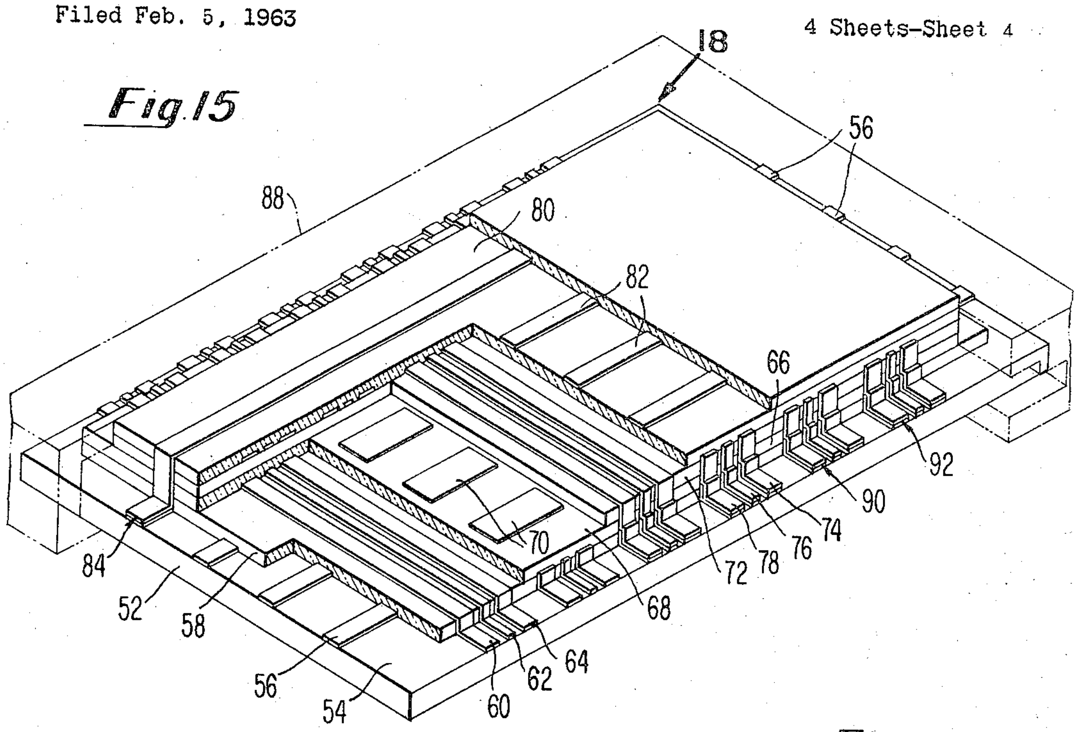
FIG. 15 is an isometric view partially broken away of a magnetic memory storage and information transfer device in accordance with the present invention.
Figure 17:
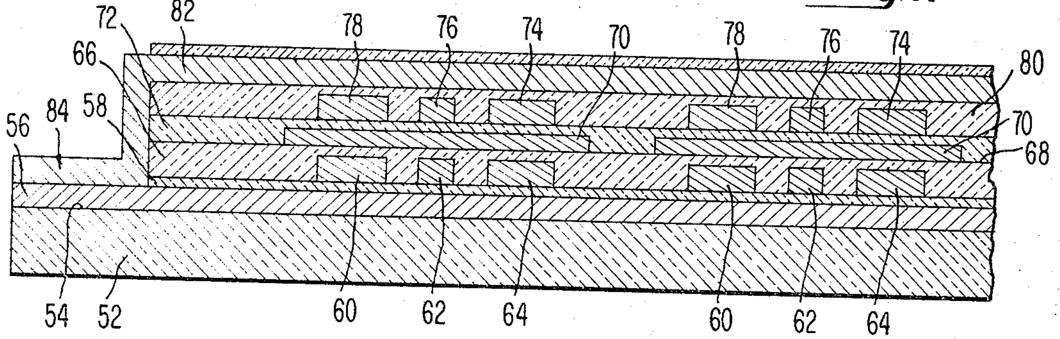
FIG. 17 is a sectional view of the device of FIG. 15.
Figure 16:
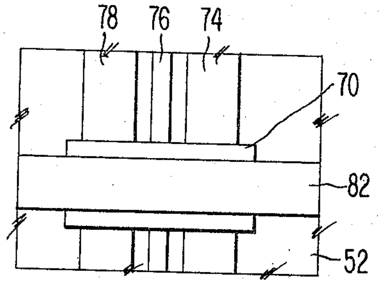
FIG. 16 is a detail view of a portion of the apparatus of FIG. 15 adjacent a magnetic bit illustrated for clarity without the intervening layers of electrical insulation.
Figure 18:
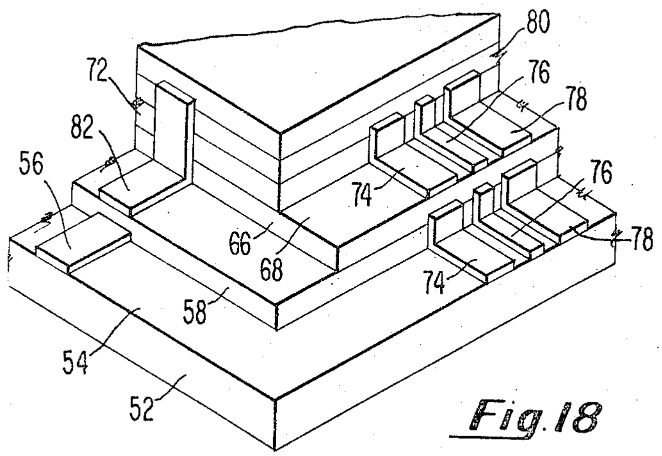
FIG. 18 is a corner view taken in the direction of arrow 18 in FIG. 15.

As earlier pointed out herein, the present invention is adapted for pluggable interconnection or reception in conventional printed wiring connectors. In this manner a plurality of memory matrix modules can be operably electrically interconnected or stacked together in any desired manner so as to form a variety of operational assemblies and subassemblies. To this end the various similar windings are joined at one of their ends thereby to form actual electrical loops or windings which effectively encircle the magnetizable storage bit with which they are associated. For example, as seen in FIG. 15, the upper and lower drive windings or conductors 56 and 82 are or may be soldered or welded together at their exposed ends 84. The opposite ends can be received in a conventional printed wiring connector 88 shown here to be L-shaped although other shapes may be employed. In like fashion the information and sense conductors 60–64 and 74–78 respectively, are connected together at one of their ends 90 and 92 thereby forming electrical windings encircling the magnetic bits at right angles to the drive windings aforementioned. The thus formed orthognal matrix module is useful as a memory plane or storage and transfer device, or if need be, a number of such matrices can be stacked together.

What is claimed is:

1. A method of fabricating an electrical memory module comprising the steps of:
(a) providing a dielectric high heat resistant substrate,
(b) applying conductive material to said substrate in a prearranged pattern thereby to form electrical conductors thereon,
(c) applying an insulating layer to said conductive pattern,
(d) firing said insulating layer to a fire polished glass-like pore free surface,
(e) depositing a thin magnetic film of material over said fire polished surface,
(f) applying an insulating layer over said thin film, and
(g) applying conductive material to said last named insulating layer in a prearranged pattern forming electrical conductors interconnecting with said first electrical conductors thereby completing an electrically conducting pathway encircling said thin film.

2. A method of fabricating an electrical memory module comprising the steps of:
(a) providing a dielectric high heat resistant substrate,
(b) applying conductive material to said substrate in a prearranged pattern thereby to form electrical conductors on said substrate,
(c) applying an insulating high heat resistant layer to said conductive pattern,
(d) heating said layer at a temperature sufficient to produce a fire polished pore free surface thereon,
(e) depositing a thin, low coercive, magnetic film of material over said fire polished surface,
(f) applying conductive material to said last named insulating layer in a prearranged pattern forming electrical conductors interconnecting with said first electrical conductors thereby completing an electrically conducting pathway around said thin film.

3. A method of fabricating an electrical memory module comprising the steps of:
(a) providing a dielectric high heat resistant substrate with a prearranged pattern of grooves therein,
(b) applying conductive material to said grooves thereby to form electrical conductors on said substrate,
(c) applying an insulating high heat resistant layer to said conductive pattern,
(d) firing said layer at an elevated temperature thereby to produce a fire polished pore free surface over said conductors,
(e) depositing magnetic material over said fire polished surface,
(f) applying an organic insulating coating over said magnetic material, and
(g) applying conductive material to said insulating coating in a prearranged pattern forming electrical conductors interconnecting with said first electrical conductors thereby completing an electrically conducting pathway encircling said magnetic material.

4. A method of fabricating an electrical memory module comprising the steps of:
(a) providing a dielectric high heat resistant substrate with a prearranged pattern of grooves therein,
(b) applying conductive material to said grooves thereby to form electrical conductors on said substrate, (c) applying an insulating high heat resistant layer to said conductive pattern,
(d) firing said layer at an elevated temperature thereby to produce a fire polished pore free surface over said conductors,
(e) depositing magnetic material over said fire polished surface,
(f) applying an insulating glass coating over said magnetic material, and
(g) applying conductive material to said insulating coating in a prearranged pattern forming electrical conductors interconnecting with said first electrical conductors thereby completing an electrically conducting pathway encircling said magnetic material.

5. A method of fabricating an electrical memory storage module comprising the steps of:
(a) applying conductive material to a high heat resistant substrate in a prearranged pattern thereby to form a first plurality of spaced apart parellel electrical conductors thereon,
(b) applying an insulating coating to said conductors,
(c) applying conductive material to said insulating coating in a prearranged pattern to form a plurality of spaced apart parallel rows of groups of three electrical conductors thereon at right angles to said first mentioned conductors,
(d) applying an insulating coating to said last mentioned conductors,
(e) heating said last named insulating coating thereby to form a fire polished glass-like surface thereon,
(f) depositing low coercive magnetic material in a thin film on said fire polished surface in rows and columns of bits in a manner such that the orthogonally arranged electrical conductors intersect at points relative to said magnetic bits,
(g) applying organic insulating material over said magnetic bits,
(h) applying conductive material to said insulating material to form a third plurality of spaced apart parallel rows of groups of three electrical conductors thereon,
(i) applying insulating material over said last named conductors,
(j) applying conductive material to said last named insulating material to form a fourth plurality of spaced apart parallel conductors thereon at right angles to said third conductors, and joining one end of said first and second conductors and one end of said third and fourth conductors together thereby forming electrical loops encircling said magnetic material.

6. A method of fabricating an electrical memory storage module comprising the steps of:
(a) applying conductive material to a high heat resistant substrate in a prearranged pattern thereby to form first electrical conductors thereon,
(b) applying an insulating coating to said conductors,
(c) applying conductive material to said insulating coating in a prearranged pattern to form second electrical conductors thereon at right angles to said first conductors,
(d) applying an insulating coating to said last mentioned conductors,
(e) heating said last named insulating coating thereby to form a fire polished glass-like surface thereon,
(f) depositing a thin film of magnetic material on said fire polished surface in rows and columns of bits in a manner such that the first and second electrical conductors intersect at points adjacent said magnetic bits,
(g) applying organic insulating material over said magnetic bits,
(h) applying conductive material to said insulating material to form third electrical conductors thereon, (i) applying insulating material over said third conductors,
(j) applying conductive material to said last named insulating material to form fourth conductors thereon at right angles to said third conductors, and,
(k) joining one end of said first and second conductors and one end of said third and fourth conductors together thereby forming electrical loops encircling said magnetic material.

7. A method of fabricating an electrical memory storage module comprising the steps of:
(a) applying conductive material to a high heat resistant substrate in a prearranged pattern thereby to form a first plurality of electrical conductors thereon,
(b) applying an insulating coating to said conductors,
(c) applying conductive material to said insulating coating in a prearranged pattern to form a second plurality of electrical conductors thereon at right angles to said first conductors,
(d) applying an insulating coating to said second conductors,
(e) heating said last named insulating coating thereby to form a fire polished glass-like surface thereon,
(f) depositing magnetic material on said fire polished surface in rows and columns of bits in a manner such that the orthogonally arranged electrical conductors intersect at points adjacent said magnetic bits,
(g) applying insulating material over said magnetic bits,
(h) applying conductive material to said last named insulating material in a prearranged pattern to form a third plurality of electrical conductors thereon,
(i) applying conductive material to said last named insulating material to form a fourth plurality of conductors thereon at right angles to said third conductors and,
(j) joining together one end of said first and second conductors and one end of said third and fourth conductors thereby forming electrical loops encircling said magnetic material.

8. A method of fabricating an electrical memory storage module comprising the steps of:
(a) applying conductive material to a high heat resistant glass substrate in a prearranged pattern of grooves thereby to form rows of parallel spaced apart electrical conductors thereon,
(b) applying an insulating coating to said conductors,
(c) applying conductive material to said insulating coating in a prearranged pattern to form rows of parallel spaced apart electrical conductors thereon at right angles to said first mentioned conductors,
(d) applying an insulating coating to said last mentioned conductors,
(e) heating said last named insulating coating thereby to form a fire polished glass-like surface thereon,
(f) depositing magnetic material on said first polished surface in a manner such that the orthogonally arranged electrical conductors form intersecting points relative to said magnetic material,
(g) applying organic insulating material over said magnetic material,
(h) applying conductive material to said insulating material to form a pattern of rows of parallel spaced apart electrical conductors thereon,
(i) applying insulating material over said last named conductors,
(j) applying conductive material to said last named insulating material in a manner forming rows of parallel spaced apart conductors thereon at right angles to said last named conductors, and, joining one end of said first and second conductors and one end of said third and fourth conductors together thereby forming electrical loops encircling said magnetic material.

(References on following page)

References Cited

UNITED STATES PATENTS 3,085,899 4/1963 Forman ---------- 117—215 X
3,100,295 8/1963 Schweizerhof ------ 117—217 X
3,100,723 8/1963 Weed -------------- 117—217
3,134,689 5/1964 Pritikin et al. -------- 117—212

3,169,892 2/1965 Lemelson --------- 117—212 X
3,256,588 6/1966 Sikind et al. ------ 117—212 X
3,257,629 6/1966 Kornreich -------- 117—240 X ALFRED L. LEAVITT, *Primary Examiner.*

WILLIAM L. JARVIS, *Examiner.*

UNITED STATES PATENT OFFICE

CERTIFICATE OF CORRECTION

Patent No. 3,347,703 October 17, 1967

Joseph H. Engelman et al.

It is hereby certified that error appears in the above numbered patent requiring correction and that the said Letters Patent should read as corrected below.

Column 2, line 22, for "encirculating" read -- encircling --; column 3, line 67, strike out "nitrate"; column 8, line 56, for "first" read -- fire --.

Signed and sealed this 5th day of November 1968.

(SEAL)
Attest:

Edward M. Fletcher, Jr.
Attesting Officer

EDWARD J. BRENNER
Commissioner of Patents